Figure 1:
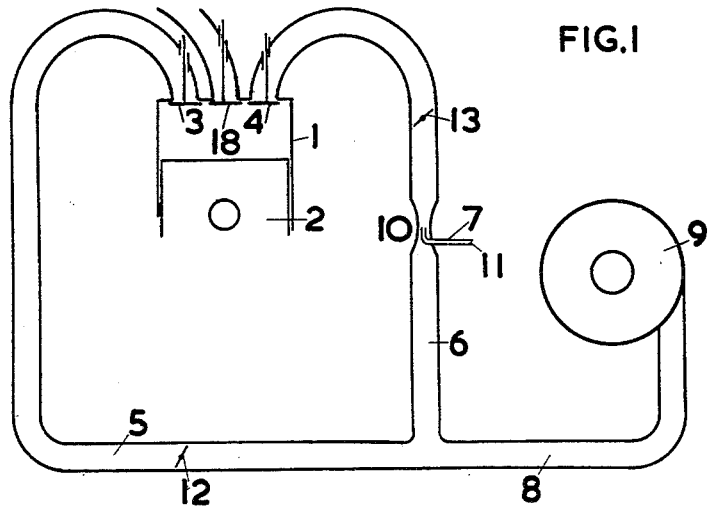

INVENTOR:
COENRAAD HIJSZELER

By  OSWALD H. MILMORE
        ATTORNEY

June 14, 1960 C. HIJSZELER 2,940,432
INTERNAL COMBUSTION ENGINE WITH AIR SCAVENGING
Filed March 22, 1957 2 Sheets-Sheet 2

INVENTOR
Coenraad Hijszeler

BY Oswald H. Milmore

ATTORNEY

United States Patent Office 2,940,432
Patented June 14, 1960

2,940,432

INTERNAL COMBUSTION ENGINE WITH AIR SCAVENGING

Coenraad Hijszeler, Velp, Netherlands, assignor to N.V. Motorenfabriek Thomassen, De Steeg, Netherlands, a Netherlands company Filed Mar. 22, 1957, Ser. No. 647,792

9 Claims. (Cl. 123—76)

The invention relates to internal combustion engines, e.g. gas or gasoline engines, with air scavenging. The term "combustion air" as used hereinafter should be taken as meaning air, either mixed with gaseous or liquid fuel or not, as the case may be. As is well known, the power per unit of cylinder volume can be substantially raised by increasing the charge, while excessive heating of the cylinder wall and, in particular, of the exhaust valve can then be combated by scavenging the cylinder with air towards the end of the exhaust stroke. If a high efficiency is to be obtained in the case of engines in which a combustible mixture of air and fuel is fed to or formed in the cylinder, it is necessary to ensure that no combustible mixture escapes through the exhaust during this scavenging period, in other words that the exhaust valve of the cylinder is closed while this mixture is being formed or supplied. This is frequently achieved by adding the fuel, after the exhaust valve has closed, to the stream of air which until then had served only for scavenging. Another method is to feed fuel into the cylinder after the air supply has been cut off and the exhaust valve has closed and then to supply compressed air again so as to form the combustible mixture of the desired composition in the cylinder. The disadvantage of these methods lies in the difficulty of obtaining a thorough mixture of fuel and air in the cylinder and particularly in the necessity of providing a complicated control system in order to ensure that the fuel-air mixture always has the desired composition or strength.

The present invention aims to equip an internal combustion engine of the said type in such a way as to eliminate the said drawbacks, which aim is reached by supplying scavenging air to the cylinder while the exhaust valve is open and then, with the exhaust valve closed and the supply of scavenging air interrupted, supplying the necessary combustion air to the cylinder via a separate line, and feeding, preferably into the said line or, if desired, straight into the combustion space, fuel in the correct ratio to the quantity of combustion air. Separate lines for the scavenging air and the combustion air are therefore connected to the cylinder but at no time are they simultaneously communicating with the cylinder space. Fuel and air may be mixed in the combustion air line before they reach the cylinder, the strength of the mixture reaching the cylinder being regulated by making the fuel supply dependent on the quantity of air passing through the combustion air line; this strength is then practically independent of the quantity or pressure of the scavenging air employed, so that the latter can be varied at will without affecting the strength of the mixture. The lines for the scavenging and combustion air may be connected to separate pumps or compressors, but may also constitute branches of a main line fed, for instance, by an exhaust gas turbine-compressor unit.

As an alternative the scavenging air line and the combustion air line may lead into the cylinder space via a common valve or port, provided that there is a change-over valve at the point where the lines join so that only one of the said lines at a time is connected to the inlet valve.

In this case, if the fuel-air mixture is formed in the combustion air line, a small quantity of mixture remains in the short common section of the lines after the mixture has been admitted to the cylinder. In order to remove this so as to prevent undesirable ignition in the intake line or explosion, this section of the line is scavenged by supplying thereto a further small quantity of air from the scavenging air line urging the small quantity of mixture present in this section towards the cylinder.

It may therefore be preferable to have the two lines lead into the cylinder via separate valves or ports, thereby obviating the necessity of this additional scavenging.

The invention is applicable both to two-stroke and four-stroke engines.

Figure 2:
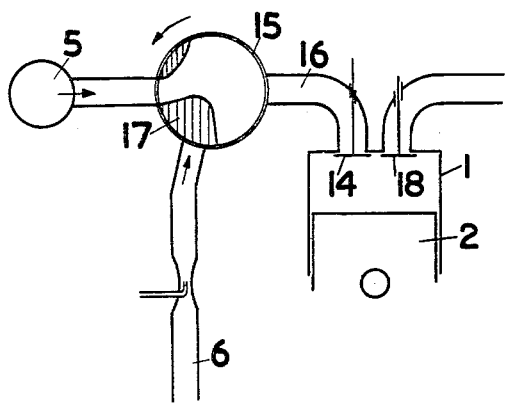
Figure 3:
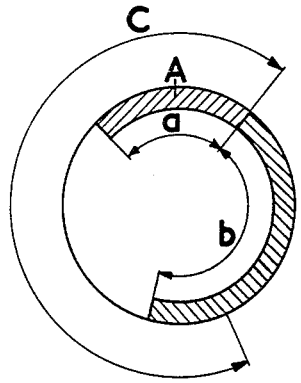

The invention will be further illustrated with reference to the drawing, wherein Figs. 1 and 2 are diagrammatic representations in longitudinal section of two constructions of a cylinder of a four-stroke engine according to the invention and Fig. 3 shows a possible diagram of the valve opening periods for the embodiment shown in Fig. 1. Figures 4A, 4B, 4C and 5 are timing diagrams of the value 17 of Fig. 2.

Referring to Figure 1, 1 is the cylinder with piston 2. In addition to an exhaust valve 18 the cylinder is provided with an ignition device, e.g. a spark plug or injector for ignition fuel, a valve 3 to admit the scavenging air and a valve 4 to admit the combustion air. The scavenging air line 5 is connected to the valve 3 and the combustion air line 6 to the valve 4. Both lines branch off from the main air line 8, to which air under pressure can be supplied from the compressor 9, which can be driven, for instance, by an exhaust gas turbine. A measuring device 10 is fitted in line 6 for the measurement of the quantity of air passing through this line. By means of suitable regulating devices fuel is supplied in a quantity proportional to the measured flow of air and can be admitted either to the combustion air line 6 or to the cylinder space via a separate inlet device provided for the purpose. A throttle valve 12 may be provided in line 5 enabling the degree of scavenging of the cylinder to be controlled, and line 6 carries a throttle valve 13 enabling the quantity of combustion air supplied to the cylinder to be varied according to the load; the latter throttle valve can, for instance, be coupled to a governor. The engine operates as shown in the diagram in Fig. 3, in which A indicates the top dead centre. Towards the end of the exhaust period c, i.e. over crank angle a, scavenging air is fed into the cylinder via valve 3, while over crank angle b valve 4 is open and combustion air is supplied to the cylinder.

It will be clear that with the arrangement described the cylinder always receives a fuel-air mixture of the desired strength in a quantity which is controlled by the throttle valve 13, while the degree of scavenging can, if desired, be regulated independently thereof with the aid of the throttle valve 12.

Figure 2 shows an engine with an alternative arrangement. The engine cylinder 1 is provided with one valve 14 for admittance of both scavenging and combustion air and one exhaust valve 18.

The valve body 17 is rotated with half the engine speed and driven, for instance, from the camshaft for the inlet and exhaust valves. Three phases can be distinguished during the operation cycle of the rotary valve (see Figures 4A, 4B, 4C and 5).

Figure 4A:
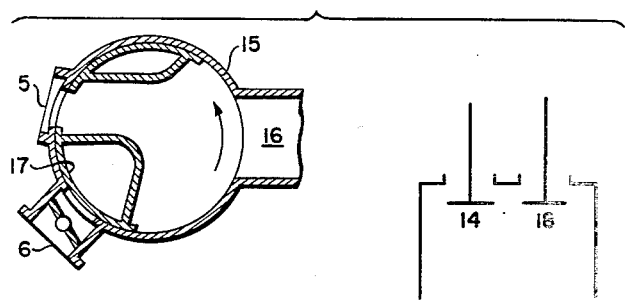

Figure 4A shows the scavenging phase; port 5 is connected to the port 16 and the inlet valve 14. This phase starts as soon as the inlet valve opens in the exhaust stroke of the engine and stops as soon as the exhaust valve is closed.

Figure 4B:
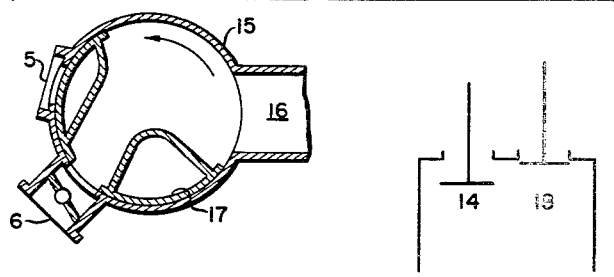

Figure 4B shows the filling phase; port 6 is connected to the port 16 and the inlet valve 14. This phase starts as soon as the exhaust valve is closed and stops just before the inlet valve is closed.

Figure 4C:
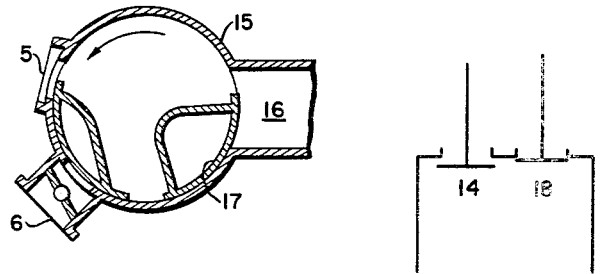

Figure 4C shows the clearing phase; port 5 is connected again to port 16 and the inlet valve 14. During this period the volume of the rotary valve housing 15 and the port 16 is cleared of combustible mixture. This period ends as soon as the inlet valve is closed. Between the clearing period and the scavenging period the mixture ports 6 will be uncovered another time, but no mixture will enter the housing 15 as the scavenging pressure will always be higher than the mixture pressure. At the end of the clearing period the housing 15 will be under scavenging pressure.

In case the supply line 6 carries no mixture, but only combustion air, the clearing phase can be suppressed.

Figure 5:
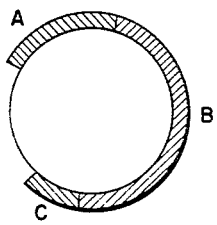

The timing diagram Figure 5 gives the position of the period in relation to the crankshaft position.

Whenever reference is made to inlet and outlet valves in connection with a four-stroke engine in the foregoing example, this reference may in the case of a two-stroke engine be understood to include piston-operated inlet and exhaust ports.

I claim as my invention:

1. In an internal combustion engine with air scavenging, a cylinder with at least one controlled exhaust port, and an air inlet port arrangement; a first duct for supplying scavenging air under superatmospheric pressure to the cylinder via said inlet port arrangement and a second duct for supplying combustion air under superatmospheric pressure to the cylinder via said inlet port arrangement; means for controlling the supply of scavenging air from said first duct to the said cylinder in such a way that such supply is effected during the latter part of the period in which the exhaust port is open and is interrupted substantially at the moment when the exhaust port is closed; means for controlling the supply of combustion air from said second duct to the said cylinder in such a way that such a supply is started at or shortly after the moment when the supply of scavenging air from said first duct is interrupted; and means for supplying fuel to the engine in a quantity dependent on the quantity of combustion air flowing through said second duct.

2. In an internal combustion engine with air scavenging, a cylinder with at least one controlled exhaust port, and two or more valve controlled air inlet ports; a first duct for supplying scavenging air under superatmospheric pressure to at least one of said ports and a second duct for supplying combustion air under superatmospheric pressure to the remainder of said ports; means for controlling the valve of each scavenging air port in such a way that such valve is opened during the latter part of the period in which the exhaust port is open and is closed substantially at the moment when the exhaust port is closed; means for controlling the valve of each combustion air port in such a way that such valve is opened at or shortly after the moment when such scavenging air port is closed; and means for supplying fuel to the engine in a quantity dependent on the quantity of combustion air flowing through said second duct.

3. In an internal combustion engine with air scavenging, a cylinder with at least one controlled exhaust port, and at least one valve controlled air inlet port; a first duct for supplying scavenging air under superatmospheric pressure to the cylinder and a second duct for supplying combustion air under superatmospheric pressure to the cylinder, the said ducts being connected to the air inlet port via a change-over element adapted to bring into communication with the air inlet port only one of said ducts at a time; means for controlling the air inlet valve and the change-over element in such a way that scavenging of the said cylinder is effected during the latter part of the period in which the exhaust port is open and is interrupted substantially at the moment when the exhaust port is closed and the supply of combustion air to the said cylinder is started at or shortly after the moment when the scavenging is interrupted; and means for supplying fuel to the engine in a quantity corresponding with the quantity of combustion air flowing through said second duct.

4. In an internal combustion engine according to claim 3 in which the second duct is provided with a fuel supplying device, the change-over element has means by which the first duct is connected with the inlet port after the supply of fuel laden air under superatmospheric pressure to the engine for such a short time that the amount of pure air under superatmospheric pressure supplied is sufficient only to replace the fuel laden air from the space between the change-over element and the air inlet port, and substantially none of the pure air enters the cylinder.

5. In an internal combustion engine with air scavenging, a cylinder with at least one controlled exhaust port, and an air inlet port arrangement; a first duct for supplying scavenging air under superatmospheric pressure to the cylinder via said inlet port arrangement and a second duct for supplying combustion air under superatmospheric pressure to the cylinder via said inlet port arrangement; means for controlling the supply of scavenging air from said first duct to the said cylinder in such a way that such supply is effected during the latter part of the period in which the exhaust port is open and is interrupted substantially at the moment when the exhaust port is closed; means for controlling the supply of combustion air from said second duct to the said cylinder in such a way that such a supply is started at or shortly after the moment when the supply of scavenging air from said first duct is interrupted; a venturi in said second duct for measuring the quantity of combustion air flowing through said duct and means for feeding into said duct a quantity of fuel dependent on the quantity of air measured.

6. In an internal combustion engine with air scavenging, a cylinder with at least one controlled exhaust port, and an air inlet port arrangement; a first duct for supplying scavenging air under superatmospheric pressure to the cylinder via said inlet port arrangement and a second duct for supplying combustion air under superatmospheric pressure to the cylinder via said inlet port arrangement; means for controlling the supply of scavenging air from said first duct to the said cylinder in such a way that such supply is effected during the latter part of the period in which the exhaust port is open and is interrupted substantially at the moment when the exhaust port is closed; means for controlling the supply of combustion air from said second duct to the said cylinder in such a way that such a supply is started at or shortly after the moment when the supply of scavenging air from said first duct is interrupted; means for supplying fuel to the engine in a quantity dependent on the quantity of combustion air flowing through said second duct; and separate means in both ducts for controlling the quantities of scavenging and of combustion air.

7. An internal combustion engine comprising a cylinder and a piston therein, a scavenging line for supplying scavenging air to the cylinder, a combustion air line at least in part separate from said scavenging line for supplying combustion air under pressure to the cylinder, means in said combustion air line for controlling the power of the engine by varying the amount of air supplied through said combustion air line, means for admitting a supply of air through said scavenging line during the latter part of the time that the exhaust for the cylinder is open and for terminating said supply, both whilst the piston is at or near its top dead center and before air is supplied through said combustion air line, and means for supplying to said cylinder fuel in an amount determined in dependence on the amount of air supplied through said combustion air line, whereby the composition of the fuel air mixture formed in the combustion chamber is substantially constant under all working conditions.

8. The method of air scavenging in an internal combustion engine having a cylinder with at least one controlled exhaust port and an air inlet port arrangement having a first duct for supplying scavenging air to the cylinder via said inlet port arrangement and a second duct for suppling combustion air under superatmospheric pressure to the cylinder via said inlet port arrangement and means for supplying fuel to the cylinder, including the steps of controlling the supply of scavenging air from said first duct to the said cylinder in such a way that such supply is effected during the latter part of the period in which the exhaust port is open and is interrupted substantially at the moment when the exahust port is closed, controlling the supply of combustion air from said second duct to said cylinder in such a way that such a supply is started at or shortly after the moment when such scavenging air port is closed and supplying fuel to the engine in a quantity dependent on the quantity of combustion air flowing through said second duct.

9. The method of operating an internal combustion enging having a cylinder and a piston therein, a scavenging line for supplying scavenging air to the cylinder, a combustion air line at least in part separate from the scavenging line for supplying combustion air under pressure to the cylinder, including the steps of controlling the power of the engine by varying the amount of air supplied through said combustion air line, admitting a supply of air through said scavenging line during the latter part of the time that the exhaust for the cylinder is open and terminating said supply while the piston is at or near its top dead center and before air is supplied through said combustion air line, and supplying fuel to said cylinder in an amount determined in dependence on the amount of air supplied through said combustion air line, whereby the composition of a fuel and air mixture formed in the cylinder is substantially constant under all working conditions.

References Cited in the file of this patent

UNITED STATES PATENTS

| | | |
|---|---|---|
| 564,576 | Altham | July 21, 1896 |
| 1,146,864 | Gibson | July 20, 1915 |
| 1,741,730 | Newton | Dec. 31, 1929 |
| 2,199,706 | Mallory | May 7, 1940 |
| 2,230,740 | Birkigt | Feb. 4, 1941 |
| 2,240,088 | Birkigt | Apr. 29, 1941 |
| 2,698,611 | Knudsen | Jan. 4, 1955 |

FOREIGN PATENTS

| | | |
|---|---|---|
| 21,782 | Great Britain | Oct. 15, 1908 |
| 298,128 | Great Britain | Sept. 5, 1929 |
| 338,560 | Great Britain | Nov. 21, 1930 |
| 402,283 | France | Oct. 2, 1909 |
| 729,698 | Germany | Dec. 21, 1942 |